H. BUTLER.
FISHING APPLIANCE.
APPLICATION FILED NOV. 18, 1909.
962,309.
Patented June 21, 1910.
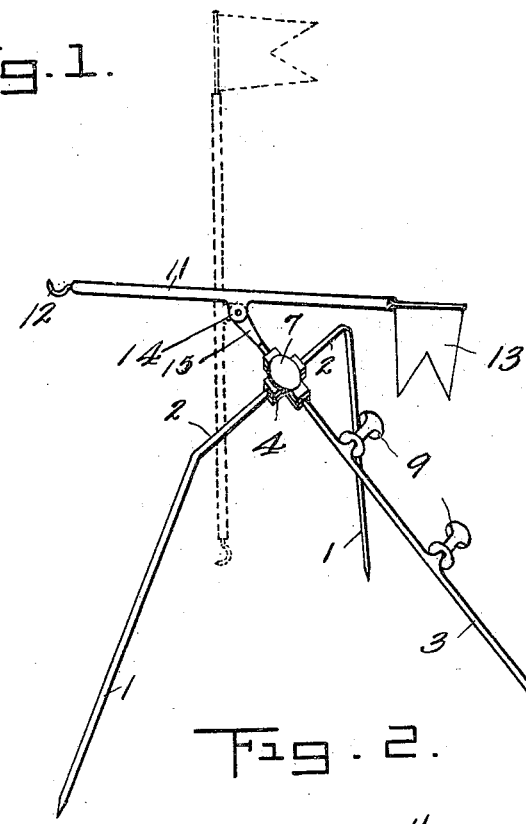
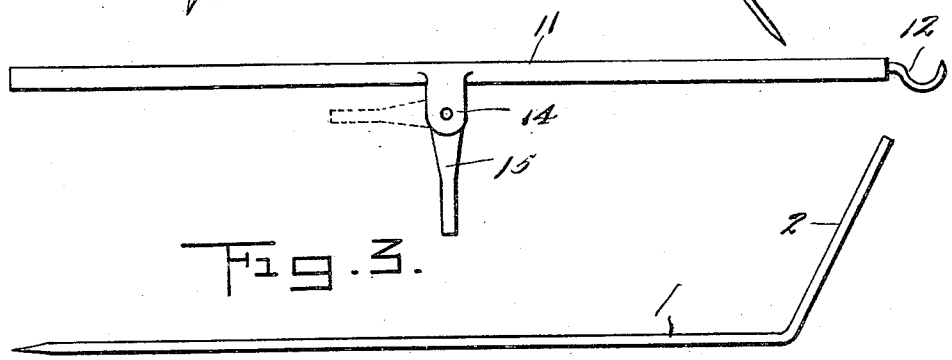
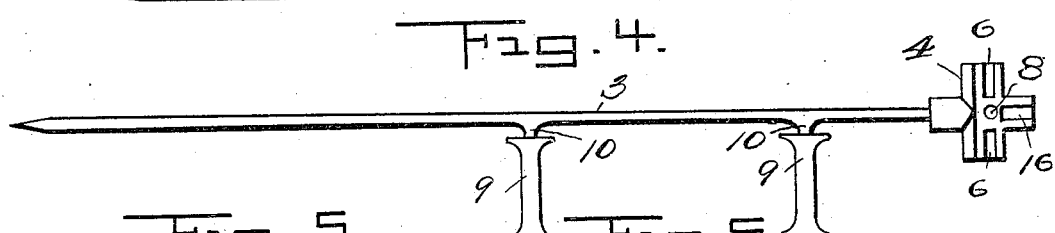
Inventor
Henry Butler
Attorney

UNITED STATES PATENT OFFICE.

HENRY BUTLER, OF WORCESTER, MASSACHUSETTS.

FISHING APPLIANCE.

962,309.

Specification of Letters Patent. Patented June 21, 1910.

Application filed November 18, 1909. Serial No. 528,760.

*To all whom it may concern:*

Be it known that I, HENRY BUTLER, a citizen of the United States, residing at Worcester, in the county of Worcester and State of Massachusetts, have invented certain new and useful Improvements in Fishing Appliances, of which the following is a specification.

My invention relates to improvements in fishing appliances, and especially to tilting devices used in connection with the line, and is particularly adaptable for fishing by line through holes in the ice covering the water.

The object of the invention is the provision of a device used in connection with, and acted upon by, the fishing line, to give a signal when a fish bites at the bait on the line, the tug on the line causing a movement of a portion of the device, which indicates that attention is required. In this manner a number of lines may be used for fishing by one attendant, whose attention will be attracted by the signal on each line, when the fish are biting.

The device is simple in construction, inexpensive in first cost and effective in operation, and consists essentially of a movable arm, carrying a signal, such as a flag, which is moved to indicating position when the bite or tug is applied to the fish line. The movable arm is preferably overbalanced by the tug on the line, this raising the signal, so that attention may be given to the fish line.

In the accompanying drawings I have illustrated one example of the physical embodiment of my invention constructed according to the best mode I have so far devised for the practical application of the principles thereof.

Figure 1 is a perspective view of a device of this character embodying the novel features of my invention, showing the signal arm and flag in indicating position by dotted lines. Fig. 2 is an enlarged view of the pivoted signal arm. Fig. 3 is a similar view of one of a pair of legs forming the stand or support for the device. Fig. 4 is a view of a third leg of the supporting frame, showing a section of the clamp-head by means of which the other two legs of the stand are held, and Figs. 5 and 6 are detail views of a section of the clamp plate, and a set screw respectively.

As illustrated clearly in Fig. 1 the supporting frame or stand comprises a pair of duplicate legs 1, 1, each having a horizontal angular extension 2, 2, and arranged in continuous alinement approximating a U-shape. The third leg of the supporting frame is formed by the bar or rod 3, each of the legs having sharpened ends so as to secure a firm hold upon the ice. At the upper ends the three legs are connected by a casting which forms a cross head, and comprises a pair of clamp plates, the numeral 4 designating a stationary plate, and 5 indicating a removable plate. The plates are fashioned with recesses for the reception of the ends of the supporting legs of the stand, the complementary recesses 6, 6, 6, 6, receiving the extensions 2, 2, and the leg 3 being firmly secured in a socket of the plate 4. The plates are held together by means of the clamp screw 7 which is screwed into the threaded openings 8, 8 in the plates and hold the legs firmly in their sockets or recesses. The supporting leg 3 may have a plurality of spools or reels 9, loosely mounted on spindles 10, projecting from the bar, to facilitate the movement of the fish line.

The device thus far described forms a rigid and stable support for the tilting signal device, which will now be described.

The signal arm 11 is provided with a hook 12 at one end, and at the other end is formed with a socket to receive the staff of the indicating flag 13. Approximately midway of the disposed weight of the signal arm, a pair of perforated ears 14 is located in which is pivoted a supporting rod or bar 15, the lower or free end of the bar being seated in a socket 16 formed by the two clamp plates.

The *modus operandi* of the apparatus is as follows: The supporting stand is arranged in proximity to a hole through the ice in position so that the hook is directly above the hole. When the line is set, it passes through the hole in the ice, over the hook on the signal arm, and down over the two reels or spools on the leg 3. A tug on the line causes the line to draw down on the hooked arm which tilts the arm on its pivot, and raises the flag in the air, the signal arm assuming the perpendicular position shown in dotted lines Fig. 1. The equilibrium of the signal arm may be established when setting the signal, by moving the flag and staff to adjusted position thus balancing the arm as desired.

Having thus fully described my invention it is evident I provide an apparatus of this character which fulfils the purposes of the invention.

What I claim and desire to secure by Letters Patent is:—

1. The combination with a supporting stand of a pivoted signal arm having a hook at one end for the purpose described, and a flag-staff and flag at the other end movable relatively to the arm to adjust the balance of the same.

2. A fishing device adapted for ready transportation, and comprising a series of supports, a clamping member having recesses formed therein to receive the ends of the various supports and lock them together, a rod engaged in one of the recesses, a tube pivotally secured to the end of the rod, a hook secured in one end of the tube, a suitable signal carried by the other end, and line carrying means carried by one of the supports, the line being adapted to be engaged by the hook, and a pull on the line serving to depress the end of the tube bearing the hook and elevate the signal.

In testimony whereof I affix my signature, in presence of two witnesses.

HENRY X BUTLER.
his mark

Witnesses:
LEWIS L. JENKINS,
FRANK F. CHANDLER.